US011609450B2

(12) United States Patent
Sugimoto

(10) Patent No.: US 11,609,450 B2
(45) Date of Patent: Mar. 21, 2023

(54) ELECTRO-OPTICAL DEVICE AND ELECTRONIC DEVICE

(71) Applicant: SEIKO EPSON CORPORATION, Tokyo (JP)

(72) Inventor: Yohei Sugimoto, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/224,074

(22) Filed: Apr. 6, 2021

(65) Prior Publication Data

US 2021/0311355 A1    Oct. 7, 2021

(30) Foreign Application Priority Data

Apr. 7, 2020   (JP) .............................. JP2020-068856

(51) Int. Cl.
*G02F 1/1335* (2006.01)
*G02F 1/1368* (2006.01)

(52) U.S. Cl.
CPC ...... *G02F 1/133526* (2013.01); *G02F 1/1368* (2013.01); *G02F 1/133502* (2013.01); *G02F 2201/50* (2013.01)

(58) Field of Classification Search
CPC ......... G02F 1/136286; G02F 1/136209; G02F 1/1368; G02F 1/134309; G02F 1/136227; G02F 1/133526; G02F 1/133345; G02F 2202/104; G02F 1/133565; G02F 2201/50; G02F 1/13629; G02F 2201/123; G03B 21/006; G03B 33/12; G03B 21/2073; G03B 21/208; G02B 3/0025; G02B 3/0018; G02B 3/0043; G02B 3/0031; H01L 27/1248; H01L 27/1259; H04N 9/3197; H04N 9/3105
See application file for complete search history.

(56) References Cited

U.S. PATENT DOCUMENTS 6,157,429 A * 12/2000 Miyawaki ......... G02F 1/133526
349/138
8,853,758 B2 * 10/2014 Ootsuka .............. H01L 27/1464
257/294

(Continued)

FOREIGN PATENT DOCUMENTS

JP         2015011090         1/2015

*Primary Examiner* — Hoan C Nguyen
(74) *Attorney, Agent, or Firm* — JCIPRNET

(57) ABSTRACT

An electro-optical device includes a first member having a translucent property, a second member having a translucent property and opposed to the first member with a space being disposed therebetween, and a plurality of pixel electrodes provided at an opposite side from the first member with respect to the second member. The first member includes a substrate body. The second member includes a transparent film. A plurality of lens surfaces having a protruding curved surface and each overlapping, in plan view, with corresponding one of the plurality of pixel electrodes are formed at a surface of the second member that is opposed to the first member. A pillar that extends through the space and is in contact with the first member and the second member is provided between the first member and the second member. The space can be formed by removing a sacrificial layer provided between the first member and the second member.

9 Claims, 17 Drawing Sheets

(56) References Cited

U.S. PATENT DOCUMENTS

| | | | |
|---|---|---|---|
| 10,634,942 B2* | 4/2020 | Ito | G02F 1/133526 |
| 2015/0002790 A1 | 1/2015 | Ito | |
| 2015/0043067 A1* | 2/2015 | Yun | G02B 26/0875 |
| | | | 359/463 |
| 2015/0268512 A1* | 9/2015 | Kwon | G03B 13/18 |
| | | | 349/2 |
| 2017/0045647 A1* | 2/2017 | Nimura | G02B 27/149 |
| 2017/0102583 A1 | 4/2017 | Ito | |
| 2020/0152667 A1* | 5/2020 | Ito | G03B 21/006 |

* cited by examiner

ELECTRO-OPTICAL DEVICE AND ELECTRONIC DEVICE

The present application is based on, and claims priority from JP Application Serial Number 2020-068856, filed on Apr. 7, 2020, the disclosure of which is hereby incorporated by reference herein in its entirety.

BACKGROUND

1. Technical Field

The present disclosure relates to an electro-optical device and an electronic device.

2. Related Art

For an electro-optical device such as a liquid crystal device used as a light valve in a projection-type display device, it is conceivable to provide a plurality of lenses at a substrate for the electro-optical device in order to suppress a loss of the amount of light at the time of displaying an image (see JP-A-2015-11090). In the electro-optical device described in JP-A-2015-11090, it is conceivable that a lens is configured by providing a lens layer made out, for example, of silicon oxynitride having a refractive index greater than a substrate body so as to fill a concave surface formed on the substrate body made out of a quartz substrate.

To increase the power of a lens, it is preferable to increase the difference in refractive index between the substrate body and the lens layer. However, for example, when the refractive index of the lens layer is increased in order to increase the difference in the refractive index, this causes a problem in that the transmittance of the light through the lens layer is prone to decrease, which makes it difficult to improve the performance of the lens.

SUMMARY

In order to resolve the problem described above, an electro-optical device according to the present disclosure includes a first member having a translucent property, a second member having a translucent property and opposed to the first member with a space being interposed therebetween, a plurality of pixel electrodes provided at an opposite side from the first member with respect to the second member, a plurality of lens surfaces having a protruding curved surface and provided at one surface of a surface, opposed to the second member, of the first member and a surface, opposed to the first member, of the second member, the plurality of lens surfaces overlapping with the plurality of pixel electrodes respectively in plan view, and a pillar extending through the space and being in contact with the first member and the second member.

The electro-optical device according to the present disclosure can be used for various types of electronic devices. When an electronic device is a projection-type display device, the electronic device includes a light source unit configured to emit illumination light entering the electro-optical device, and a projection optical system configured to project modulation light emitted from the electro-optical device.

DESCRIPTION OF EXEMPLARY EMBODIMENTS

Figure 1:
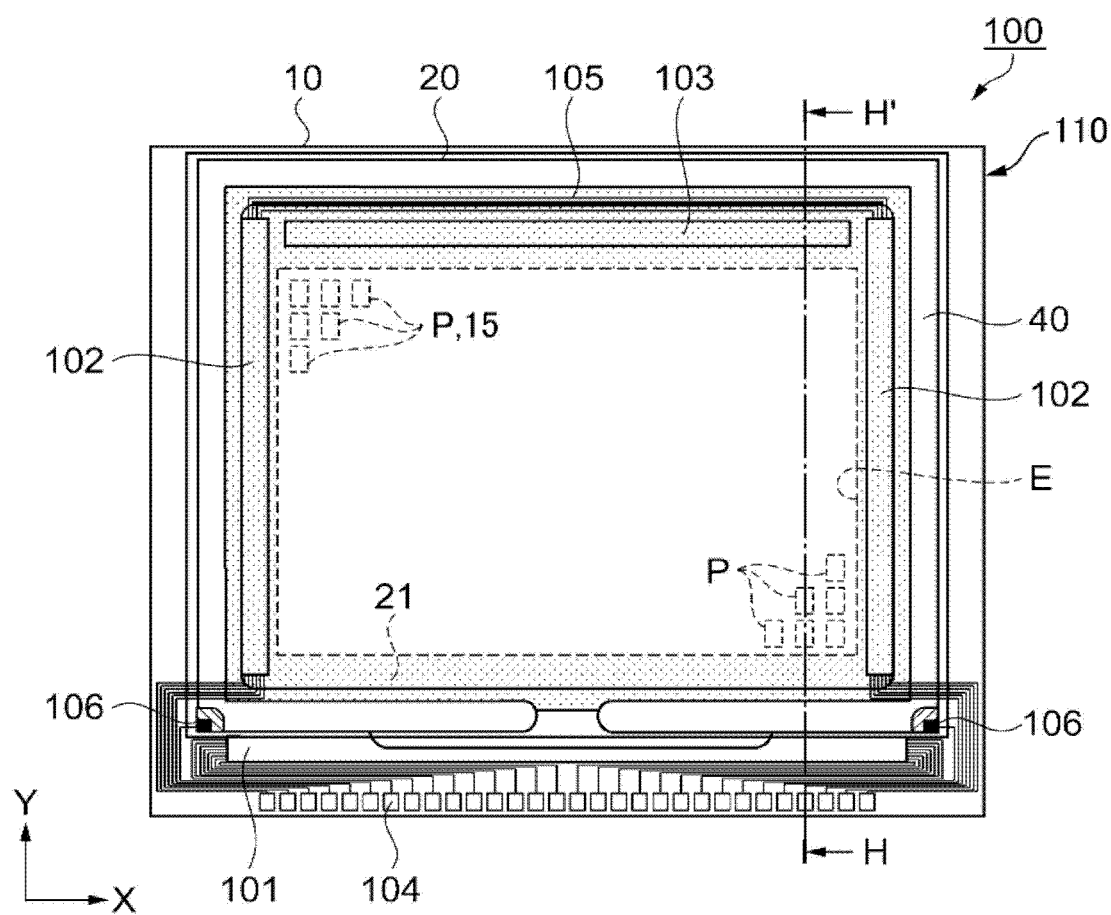
FIG. 1 is an explanatory diagram illustrating a planar configuration of an electro-optical device according to a first embodiment of the present disclosure.

Embodiments according to the present disclosure will be described with reference to the drawings. Note that, in each of the figures to be referred to in the following description, each layer or each member is scaled differently from one to another in order to illustrate each layer or each member so as to have a recognizable size in the drawing. Furthermore, in the following description, when a film or the like formed at a first substrate 10 is described, an upper layer means a second substrate 20 side, and a lower layer means an opposite side of the first substrate 10 from the second substrate 20. When a film or the like formed at the second substrate 20 is described, an upper layer means a first substrate 10 side, and a lower layer means an opposite side of the second substrate 20 from the first substrate 10. Further, a plan view means a state as viewed from a normal direction with respect to the first substrate 10 and the second substrate 20. In the present description, where the X axis and the Y axis are set as coordinate axes intersecting at right angles within a plane of the first substrate 10, the "plan view" represents viewing from a direction perpendicular to the X axis and the Y axis.

First Embodiment

1. Overall Configuration

Figure 2:
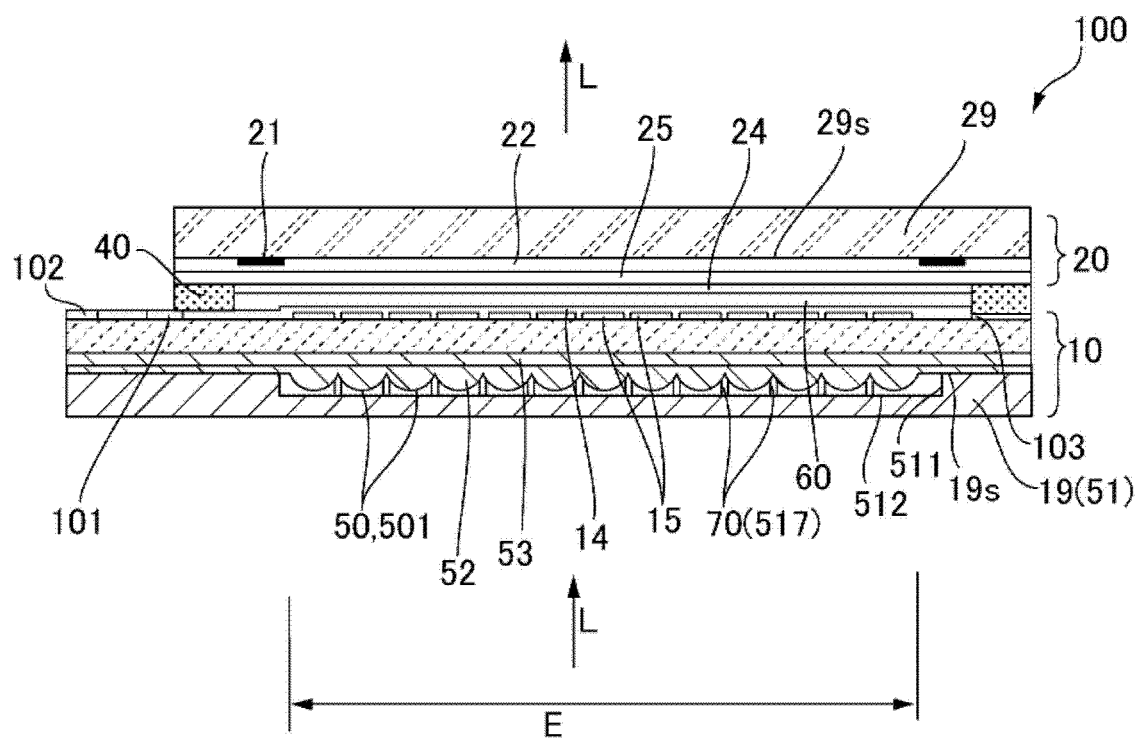
FIG. 2 is a cross-sectional view taken along the H-H' line of the electro-optical device illustrated in FIG. 1.

FIG. 1 is an explanatory diagram schematically illustrating a planar configuration of an electro-optical device 100 according to a first embodiment of the present disclosure. FIG. 2 is a cross-sectional view taken along the H-H' line of the electro-optical device 100 illustrated in FIG. 1. The electro-optical device 100 illustrated in FIGS. 1 and 2 is a liquid crystal device, and includes a liquid crystal panel 110. The liquid crystal panel 110 includes a first substrate 10 and a second substrate 20 opposed to the first substrate 10. The first substrate 10 and the second substrate 20 are affixed to each other through a seal material 40 having a frame shape. An electro-optical layer 60 including a liquid crystal layer is held in a space surrounded by the seal material 40 in a space between the first substrate 10 and the second substrate 20.

The first substrate 10 is larger than the second substrate 20, and the seal material 40 is disposed along an outer edge of the second substrate 20. The electro-optical layer 60 is made out of a liquid crystal material having a positive or negative dielectric anisotropy. The seal material 40 is made out, for example, of an adhesive such as a thermosetting or ultraviolet-curable epoxy resin, and includes a space (not illustrated) used to maintain a constant space between the first substrate 10 and the second substrate 20.

A pixel area E is provided within a region surrounded by the seal material 40. In the pixel area E, a plurality of pixels P each including a pixel electrode 15 are arranged in a matrix manner. The second substrate 20 includes a partition portion 21 that surrounds the periphery of the pixel area E, the partition portion 21 being provided between the seal material 40 and the pixel area E. The partition portion 21 includes a light shielding layer made out, for example, of a metal or metallic oxide. Although no illustration is given, the light shielding layer may be configured in the second substrate 20 as a black matrix that overlaps with a boundary portion between adjacent pixels P in plan view.

The first substrate 10 includes a light-transmitting substrate body 19 made out, for example, of a quartz substrate, a sapphire substrate, and a glass substrate. Along one side of the first substrate 10, a data-line driving circuit 101 and a plurality of terminals 104 are formed outside the pixel area E and on a one-surface 19s side, which is located on the second substrate 20 side, of the substrate body 19. In addition, a scanning line drive circuit 102 is formed along other sides adjacent to this one side. On the one-surface side 19s of the substrate body 19, an inspection circuit 103 is provided outside the pixel area E and along a side opposed to the side where the terminals 104 are arranged. A plurality of wiring lines 105 configured to couple two scanning line drive circuits 102 are provided on the one-surface side 19s of the substrate body 19 and between the seal material 40 and the inspection circuit 103. The plurality of wiring lines coupled to the data-line driving circuit 101 and the scanning line drive circuit 102 are each coupled correspondingly to the plurality of terminals 104. Below, the X-axis direction represents a direction in which the terminals 104 are arranged, and the Y-axis direction represents a direction perpendicular to the X-axis direction.

A flexible wiring substrate (not illustrated) is coupled to the terminal 104. Various potentials or various types of signals are inputted through the flexible wiring substrate to the first substrate 10. In addition, at the one-surface 19s side of the substrate body 19, the pixel P includes a plurality of translucent pixel electrodes 15 made out of an electrically conducting translucent film such as an indium tin oxide (ITO) film and also includes switching elements (not illustrated in FIG. 2) each electrically coupled to corresponding one of the plurality of pixel electrodes 15, the translucent pixel electrodes 15 and the switching elements being formed in a matrix manner. A first alignment film 14 is formed at the second substrate 20 side with respect to the pixel electrode 15. The pixel electrodes 15 are covered with the first alignment film 14. Thus, a portion from the substrate body 19 to the first alignment film 14 corresponds to the first substrate 10. In this specification, "translucent" is same as "light transmissive".

The second substrate 20 includes a light-transmitting substrate body 29 made out, for example, of a quartz substrate, a sapphire substrate, or a glass substrate. At a one-surface 29s side, opposed to the first substrate 10, of the substrate body 29, there are provided a partition portion 21, a flattening layer 22 made out, for example, of silicon oxide and covering the partition portion 21, a common electrode 25 covering the flattening layer 22, and a second alignment film 24 covering the common electrode 25. In plan view, the partition portion 21 surrounds the periphery of the pixel area E and overlaps with the scanning line drive circuit 102 and the inspection circuit 103. Thus, the partition portion 21 blocks light entering the scanning line drive circuit 102 or the like from the second substrate 20 side, thereby preventing malfunction due to the light. The common electrode 25 is made out of an electrically conducting translucent film such as ITO, and is electrically coupled to the terminal 104 through an inter-substrate conduction portion 106 and a wiring line provided at the first substrate 10.

The first alignment film 14 and the second alignment film 24 are selected on the basis of optical design of the electro-optical device 100. The first alignment film 14 and the second alignment film 24 include an inorganic alignment film made out, for example, of silicon oxide (SiOx) and obtained by using a vapor deposition method to form a film, and causes liquid crystal molecules having negative dielectric anisotropy to be substantially vertically aligned. The first alignment film 14 and the second alignment film 24 may include an organic alignment film made out, for example, of polyimide formed through a rubbing process applied to the surface. The organic alignment film causes liquid crystal molecules having positive dielectric anisotropy to be substantially horizontally aligned.

In the electro-optical device 100 according to the present embodiment, the pixel electrode 15 and the common electrode 25 are made out of an electrically conducting translucent film. The electro-optical device 100 is configured as a translucent-type liquid crystal device. With such an electro-optical device 100, light, which is the visible light, enters the electro-optical layer 60 from either one substrate of the first substrate 10 and the second substrate 20, and passes through the other substrate to be outputted. During this travel, the light is modulated, and an image is displayed. In the present embodiment, as indicated by the arrow L in FIG. 2, light enters the electro-optical layer 60 from the first substrate 10 side, and passes through the second substrate 20 to be outputted. During this travel, the light is modulated, and an image is displayed. Thus, the first substrate 10 is provided on the light entrance side, and the second substrate 20 is opposed to the first substrate 10 at the light exit side.

The electro-optical device 100 according to the present embodiment is configured as a liquid crystal device using a normally white mode or a normally black mode, the mode of which depends on the optical design of a polarizing element disposed at each of the light entrance side and the light exit side. In the normally white mode, the transmittance of the pixel P is the maximum in a state where no voltage is applied. In the normally black mode, the transmittance of the pixel P is minimum in a state where no voltage is applied.

2. Electrical Configuration

Figure 3:
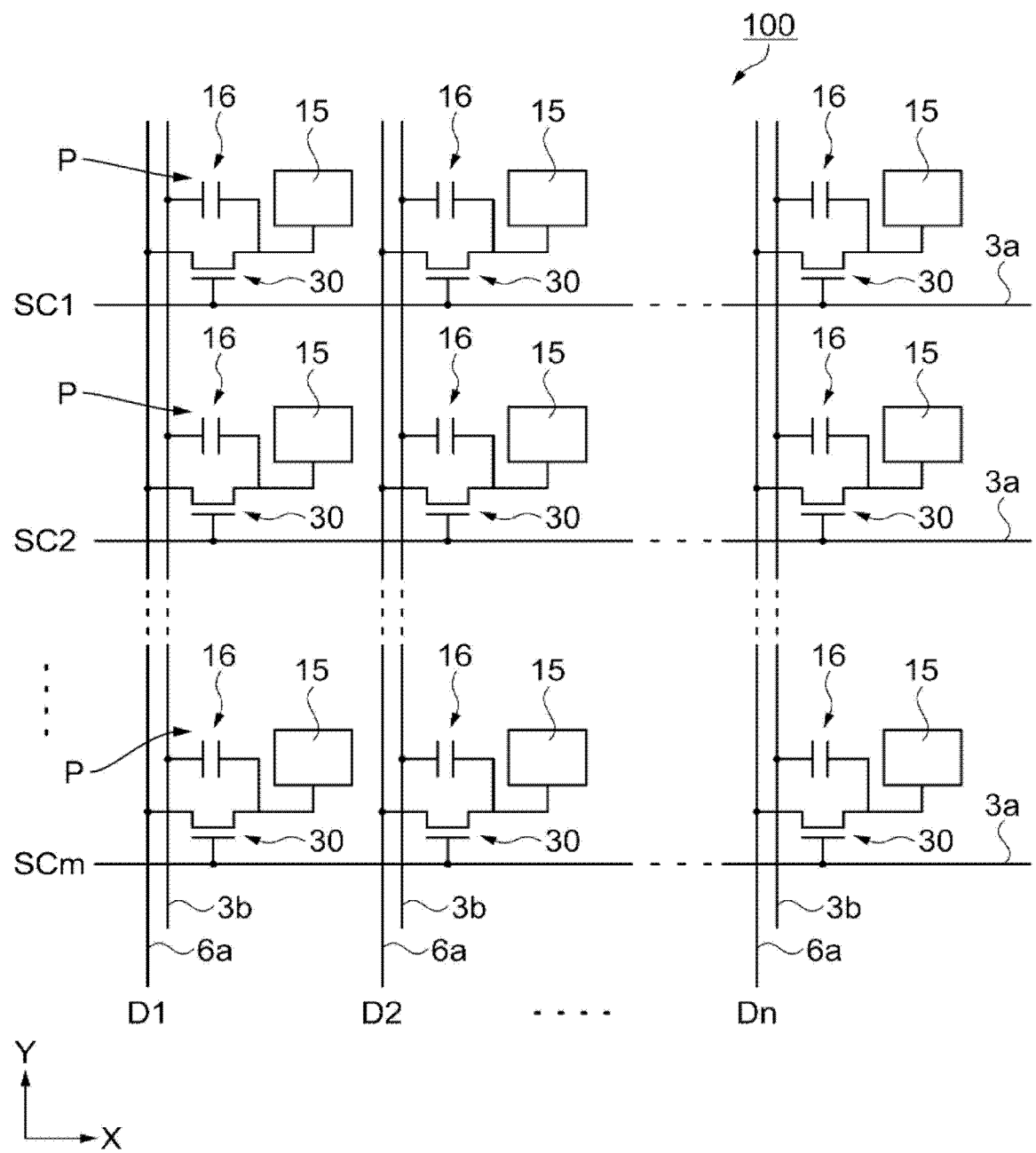
FIG. 3 is an explanatory diagram illustrating an electrical configuration of the electro-optical device illustrated in FIG. 1.

FIG. 3 is an explanatory diagram illustrating an electrical configuration of the electro-optical device 100 illustrated in FIG. 1. As illustrated in FIG. 3, the electro-optical device 100 includes a plurality of scanning lines 3a extending in the X-axis direction in at least the pixel area E, and a plurality of data lines 6a extending in the Y-axis. The scanning lines 3a and the data lines 6a are insulated from each other at the first substrate 10. In the present embodiment, the first substrate 10 includes a capacitance line 3b extending along the data lines 6a. In addition, the pixels P are provided at corresponding intersections between the plurality of scanning lines 3a and the plurality of data lines 6a. The plurality of pixels P each include a pixel electrode 15, a switching element 30 including a thin film transistor (TFT), and a storage capacitor 16. The scanning lines 3a are each electrically coupled to a gate of the switching element 30. The data lines 6a are each electrically coupled to a source of the switching element 30. The pixel electrode 15 is electrically coupled to a drain of the switching element 30.

The data lines 6a are coupled to the data-line driving circuit 101 illustrated in FIG. 1, and supply the pixels P with image signals D1, D2, . . . , and Dn supplied from the data-line driving circuit 101. The scanning lines 3a are coupled to the scanning line drive circuit 102 illustrated in FIG. 1, and sequentially supply the pixels P with scanning signals SC1, SC2, . . . , and SCm supplied from the scanning line driving circuit 102. The image signals D1 to Dn supplied from the data-line driving circuit 101 to the data lines 6a may be supplied in this order in a line sequential manner, or may be supplied on a group-by-group basis, the group being comprised of a plurality of data lines 6a adjacent to each other. The scanning line drive circuit 102 supplies, in a line sequential manner, the scanning lines 3a with the scanning signals SC1 to SCm at predetermined timing.

In the electro-optical device 100, during a period of time when the scanning signals SC1 to SCm are inputted to bring the switching element 30 into an ON state, the image signals D1 to Dn supplied from the data lines 6a are written in the pixel electrode 15 at predetermined timing. The image signals D1 to Dn written in the electro-optical layer 60 through the pixel electrodes 15 and set at a predetermined level are retained for a certain period of time between the pixel electrodes 15 and the common electrode 25 disposed so as to be opposed to the pixel electrodes 15 with the electro-optical layer 60 being interposed therebetween. The frequency of the image signals D1 to Dn is 60 Hz, for example. In the present embodiment, the storage capacitor 16 is coupled in parallel with a liquid crystal capacitor formed between the pixel electrode 15 and the common electrode 25 in order to prevent a leakage of the image signals D1 to Dn retained between the pixel electrode 15 and the electro-optical layer 60. The storage capacitor 16 is provided between the drain of the switching element 30 and the capacitance line 3b.

The data lines 6a are coupled to the inspection circuit 103 illustrated in FIG. 1, and the inspection circuit 103 is used to check operational defects and the like of the electro-optical device 100 by detecting the image signals described above in a process of manufacturing the electro-optical device 100. Note that, in FIG. 1, the data-line driving circuit 101, the scanning line drive circuit 102, and the inspection circuit 103 are illustrated as peripheral circuits formed on the outer side of the pixel region E. However, it may be possible to provide a sampling circuit that is configured to sample the image signals described above and supply the sampled image signals to the data lines 6a, a pre-charge circuit that is configured to supply pre-charge signals of a predetermined voltage level to the data lines 6a in advance of the image signals D1 to Dn described above, or the like.

3. Configuration of Lens

Figure 4:
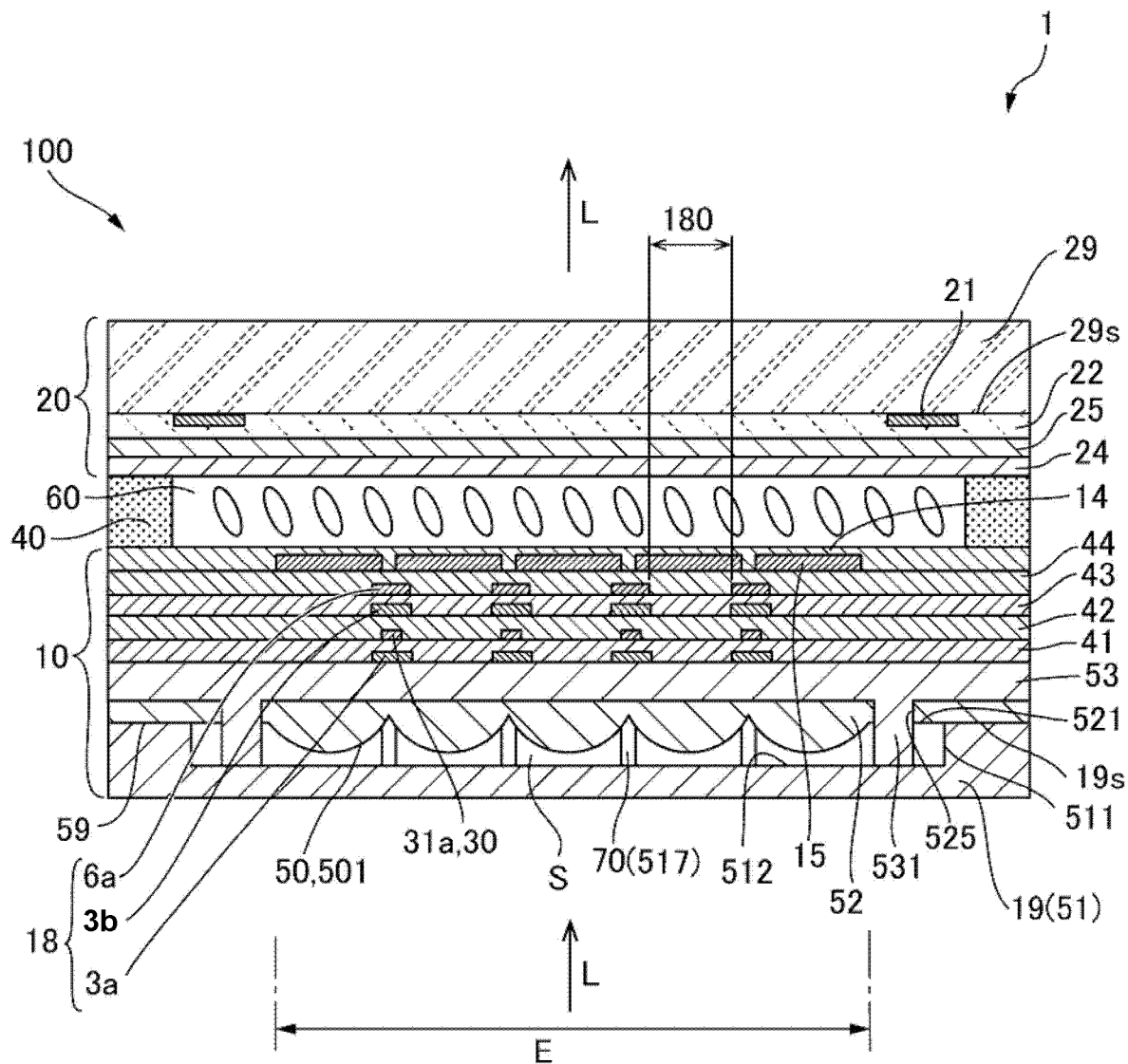
FIG. 4 is a schematic explanatory diagram obtained by enlarging part of the cross section illustrated in FIG. 2.
Figure 5:
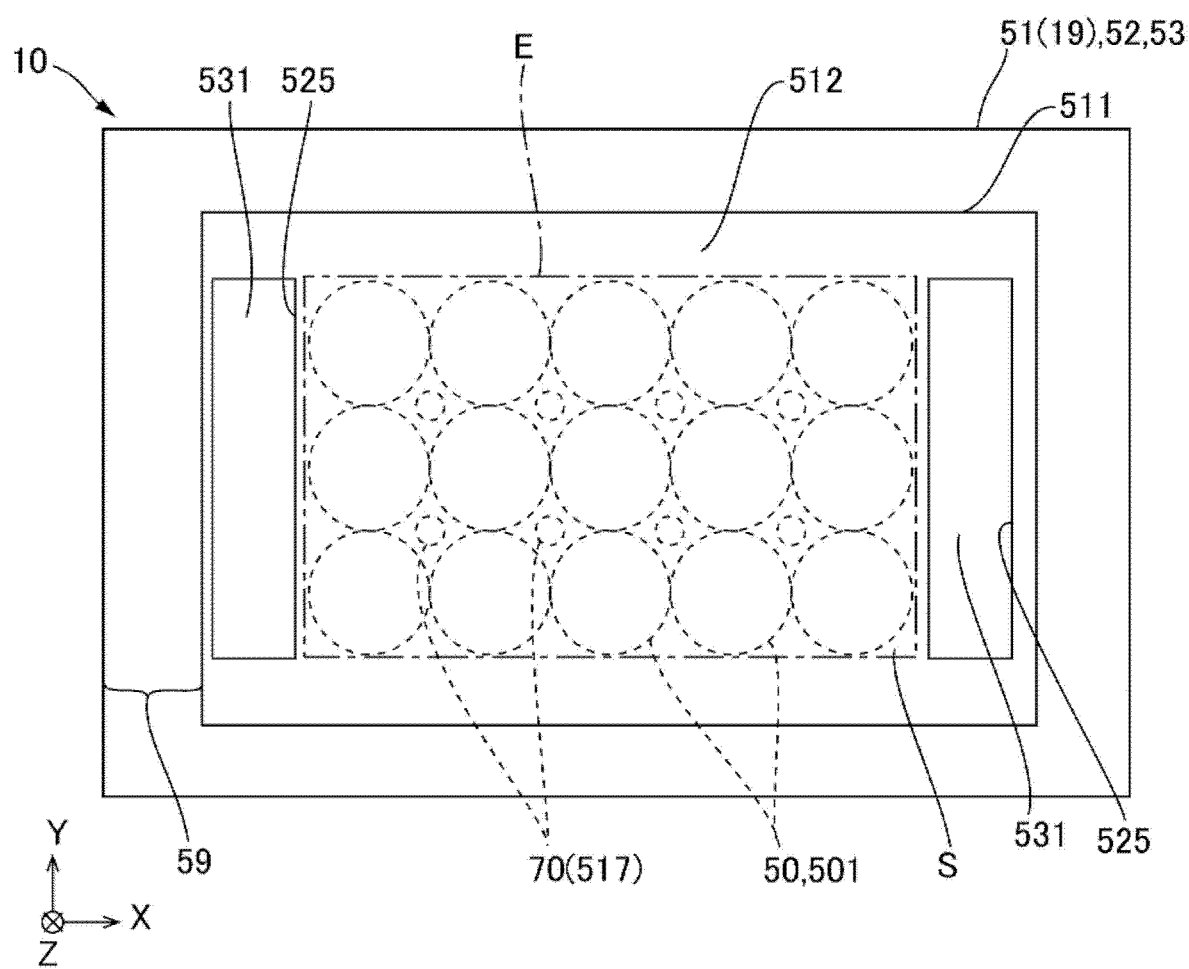
FIG. 5 is an explanatory diagram illustrating a planar arrangement of lenses or the like illustrated in FIG. 4.

FIG. 4 is a schematic explanatory diagram obtained by enlarging part of the cross section illustrated in FIG. 2. FIG. 5 is an explanatory diagram illustrating a planar arrangement of lens 50 or the like illustrated in FIG. 4. In FIG. 4, translucent interlayer dielectrics 41, 42, 43, and 44 made out, for example, of silicon oxide are sequentially stacked between the substrate body 19 and the pixel electrode 15. Various types of wiring lines and various types of electrodes are disposed between the substrate body 19 and the interlayer dielectric 41 or between layers of the interlayer dielectrics 41, 42, 43, and 44. For example, the scanning lines 3a are formed between the substrate body 19 and the interlayer dielectric 41. The switching element 30 is formed between the interlayer dielectric 41 and the interlayer dielectric 42. The capacitance line 3b is formed between the interlayer dielectric 42 and the interlayer dielectric 43. The data lines 6a are formed between the interlayer dielectric 43 and the interlayer dielectric 44. The pixel electrode 15 is formed between the interlayer dielectric 44 and the electro-optical layer 60. The scanning line 3a, the capacitance line 3b, and the data line 6a constitute a light shielding member 18 in a lattice form in plan view. In plan view, the light shielding member 18 extends along a portion between adjacent pixel electrodes 15, and overlaps with a semiconductor layer 31a of the switching element 30. Thus, the light shielding member 18 suppresses entrance of light into the semiconductor layer 31a to suppress occurrence of an optical leakage current at the switching element 30.

In the electro-optical device 100, only the light passing through the light transmission area 180 surrounded by the light shielding member 18 contributes to displaying an image, from among the light entering from the first substrate 10 side. In the present embodiment, the first substrate 10 includes a plurality of lenses 50 provided so as to each overlap with corresponding one of the plurality of pixel electrodes 15 in plan view, with the aim of the light entering from the first substrate 10 side being not blocked by the light shielding member 18 and increasing the percentage at which this light passes through the light transmission area 180.

In the present embodiment, the lens 50 is configured to include a translucent first member 51 and a translucent second member 52 opposed to the first member 51 at the pixel electrode 15 side. A space S is interposed between these members. A plurality of lens surfaces 501 having a protruding curved surface are provided on either one of a surface of the first member 51 that is opposed to the second member 52 and a surface of the second member 52 that is opposed to the first member 51, the plurality of lens surfaces 501 each overlapping with corresponding one of the plurality of pixel electrodes 15 in plan view. Thus, the lens surfaces 501 and the space S form an interface to configure the lens 50. In addition, a translucent third member 53 is provided at an opposite side of the second member 52 from the first member 51.

In the present embodiment, the first member 51 is the substrate body 19 of the first substrate 10, and the second member 52 and the third member 53 each include a transparent film. More specifically, the first member 51 is made out of a quartz substrate, and the second member 52 and the third member 53 are each made out of silicon oxide. The third member 53 is stacked between the second member 52 and the interlayer dielectric 41. In addition, the lens surface 501 is provided on a surface 521 of the second member 52 that is opposed to the first member 51.

In the present embodiment, the lens 50 is configured by using a method that will be described later with reference to FIGS. 6 and 7. Thus, a recessed portion 511 is provided in a region including the pixel area E and on the surface 19s, located on the second member 52 side, of the first member 51 including the substrate body 19. The surface 19s of the substrate body 19 and a surface 521 of the second member 52 are in contact with each other at the outer periphery region 59 surrounding the recessed portion 511 at the outer side thereof. Thus, the space S is comprised of the recessed portion 511. In addition, the plurality of lens surfaces 501 are provided at positions that each overlap with a bottom 512 of the recessed portion 511 at the second member 52 in plan view, and protrude toward the first member 51. However, the plurality of lens surfaces 501 are spaced apart from the bottom 512 of the recessed portion 511, and the lens surfaces 501 as a whole constitute the interface with the space S.

Here, the second member 52 includes a through-hole 525 provided outside the pixel area E and overlapping with the space S in plan view. A portion of the third member 53 forms a protrusion 531 that extends through the through-hole 525 and the space S and protrudes until it is in contact with the first member 51. In the present embodiment, the through-hole 525 is provided at each of both ends of the pixel E in the X-axis direction. The protrusion 531 of the third member 53 is provided at each of both ends of the pixel area E in the X-axis direction so as to penetrate the through hole 525 and the space S and be in contact with the bottom 512 of the recessed portion 511. In this state, the through-hole 525 is filled with the protrusion 531 of the third member 53. Thus, the space S is an airtight space. The inside of the space S is set to be an atmosphere filled with a gas such as air, or under a vacuum atmosphere. Note that the space S may not be an airtight space.

In the lens 50 configured as described above, the second member 52 and the third member 53 are each made out of a transparent film, which makes the second member 52 and the third member 53 prone to bend. Thus, in the present embodiment, a pillar 70 is provided between the first member 51 and the second member 52. The pillar 70 extends through the space S in the pixel area E, and is in contact with both of the first member 51 and the second member 52. In the present embodiment, the pillar 70 includes a pillar-shaped protruding portion 517 that protrudes from the first member 51 to the second member 52. More specifically, the pillar 70 is comprised of the pillar-shaped protruding portion 517 that protrudes from the first member 51 to the second member 52. In the present embodiment, the pillar 70 is formed into a cylindrical shape. Note that the pillar 70 may have a prism shape.

As illustrated in FIG. 5, the pillar 70 is provided at a plurality of locations in the pixel area E so as to overlap with a region surrounded by the lens surfaces 501 in plan view. This makes it possible to prevent a portion of the pillar 70 from overlapping with the lens surface 501. In addition, when a portion of the pillar 70 overlaps with the lens surface 501, it is possible to minimize the overlap between the pillar 70 and the lens surface 501. Thus, a reduction of the lens surface 501 due to the pillar 70 is less likely to occur, which makes it possible to achieve a large lens surface 501.

4. Manufacturing Method

Figure 6:
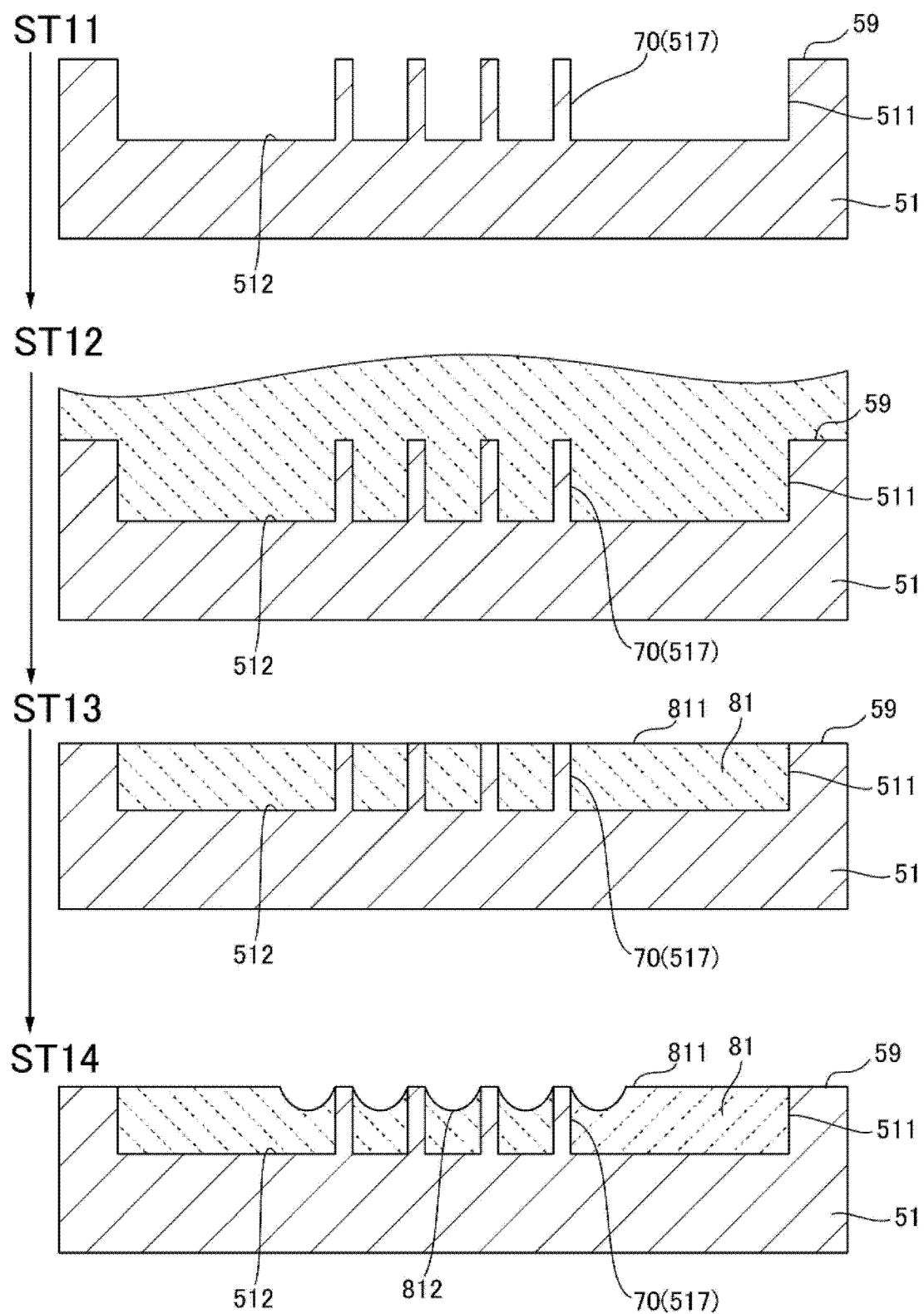
FIG. 6 is a cross-sectional view illustrating steps in a method of manufacturing the electro-optical device illustrated in FIG. 2.

FIG. 6 is a cross-sectional view illustrating steps in a method of manufacturing the electro-optical device 100 illustrated in FIG. 2. FIG. 7 is a cross-sectional view illustrating steps in the method of manufacturing the electro-optical device 100 illustrated in FIG. 2. FIGS. 6 and 7 schematically illustrate steps of forming the lens 50 illustrated in FIG. 4 in the process of manufacturing the electro-optical device 100. Note that, in FIGS. 6 and 7, in order to facilitate understanding of the steps of forming the lens surface 501, the pillar 70, and the protrusion 531, the scale or positional relationship of these elements are shifted. For example, when the first member 51 is cut at a position where the plurality of lens surfaces 501 pass through, the cross section of the pillar 70 is not supposed to be viewed. However, in FIGS. 6 and 7, the cross section of the pillar 70 is illustrated.

At the time of forming the lens 50, an etching mask is first provided on the first member 51. In this state, in step ST11 illustrated in FIG. 6, etching is applied to the first member 51 through an opening portion of the etching mask to form the recessed portion 511. At this time, etching is applied while leaving the pillar-shaped protruding portion 517 that protrudes from the bottom 512 of the recessed portion 511 to form the pillar-shaped protruding portion 517.

Next, in step ST12, a sacrificial film 81 is formed so as to fill the recessed portion 511. Then, in step ST13, the surface of the sacrificial film 81 is flattened using a chemical mechanical polishing (CMP) method or the like to make the sacrificial film 81 and the end portion of the pillar 70 continue with each other to form a flat surface. There is no limitation as to the material of the sacrificial film 81, provided that the etching selection ratio concerning quartz or silicon oxide is high. In the present embodiment, the sacrificial film 81 is made of silicon.

Next, in step ST14, in a state where an etching mask is provided on the surface of the sacrificial film 81, isotropic etching is applied to the sacrificial film 81 from the opening portion of the etching mask to form a hemispherical concave surface 812 on a surface 811 of the sacrificial film 81.

Figure 7:
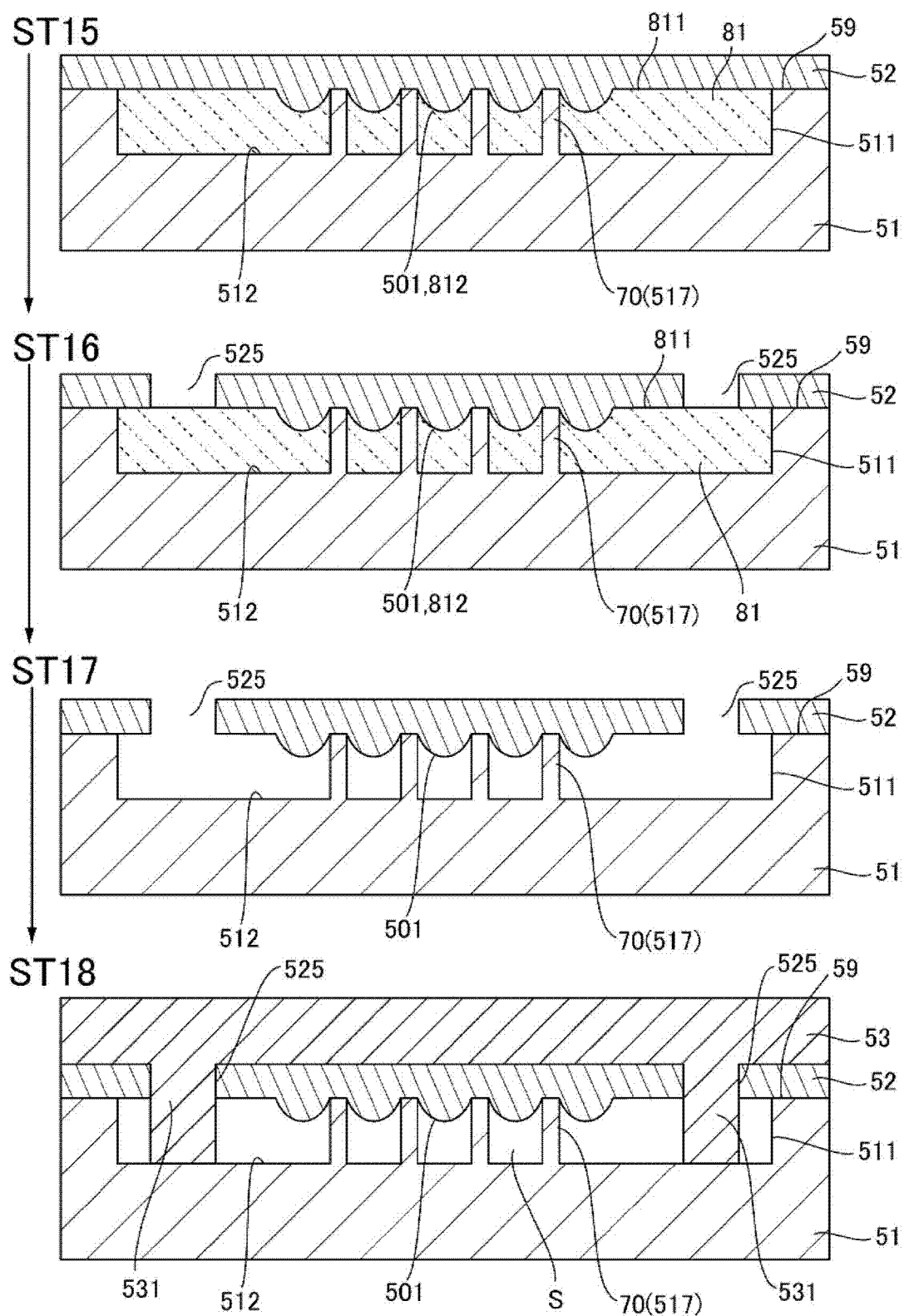
FIG. 7 is a cross-sectional view illustrating steps in the method of manufacturing the electro-optical device illustrated in FIG. 2.

Next, in step ST15 illustrated in FIG. 7, a silicon oxide film is formed and then, the surface thereof is flattened to make the second member 52. With this step, a portion of the second member 52 that overlaps with the concave surface 812 of the sacrificial film 81 becomes the lens surface 501 including a protruding curved surface. In addition, the protruding portion 517 becomes the pillar 70 that is in contact with the second member 52. Next, in step ST16, in a state where an etching mask is provided on the second member 52, etching is applied to the second member 52 from an opening portion of the etching mask to form the through-hole 525 in the second member 52.

Next, in step ST17, etching is applied from the through-hole 525 to remove the sacrificial film 81. In the present embodiment, since the sacrificial film 81 is made of silicon, dry etching using a fluorine-based gas such as sulfur hexafluoride ($SF_6$), or wet etching using fluonitric acid, or gas etching using a fluorine-based gas such as chlorine trifluoride ($ClF_3$) is performed. With this step, the space S is formed between the first member 51 and the second member 52 to configure the lens 50 in which the space S and the lens surface 501 forms an interface.

Next, in step ST18, after a silicon oxide film is formed, the surface is flattened to make the third member 53. At this time, a portion of the third member 53 is also formed within the space S through the through-hole 525. With this step, the portion of the third member 53 extends through the through-hole 525 and the space S to form the protrusion 531 that is in contact with the first member 51.

After this, the scanning line 3a, the interlayer dielectric 41, and the like are sequentially formed on an opposite surface of the third member 53 from the second member 52. This makes it possible to manufacture the first substrate 10 of the electro-optical device 100 illustrated in FIG. 4.

5. Main Effects of Present Embodiment

As described above, the electro-optical device 100 according to the present embodiment includes the translucent first member 51, and the translucent second member 52 opposed to the first member 51 with the space S being interposed therebetween. The surface of the second member 52 that is opposed to the first member 51 includes the lens surface 501 having a protruding curved surface. The lens surface 501 is in contact with the space S. Thus, in the lens 50, a difference in refractive index at the interface between the lens surface 501 and the space S is large. In addition, the space S is highly translucent. Thus, it is possible to achieve the lens 50 exhibiting an excellent lens performance such as exhibiting high positive power without using a material having a large refractive index as well as having a low translucent property.

Furthermore, the first member 51 serves as the substrate body 19 of the first substrate 10, and the second member 52 constitutes the lens 50 between the light shielding member 18 and the substrate body 19. Thus, of light entering from the first substrate 10 side, light traveling toward the light shielding member 18 can be guided to the light transmission area 180. This makes it possible to enhance efficiency of use of light at the time of display an image.

Furthermore, in the present embodiment, the pillar 70 that extends through the space S and is in contact with the first member 51 and the second member 52 is provided between the first member 51 and the second member 52. This suppresses the second member 52 flexing toward the first member 51 side. Thus, the lens 50 is less likely to positionally shift relative to the pixel electrode 15, which allows the lens 50 to be disposed at a position that overlaps with the pixel electrode 15 in plan view. In addition, the pillar 70 is comprised of the pillar-shaped protruding portion 517 that protrudes from the first member 51 toward the second member 52. Thus, it is possible to form the pillar 70 concurrently at the time of forming the recessed portion 511 used to form the space S. This eliminates the need of adding a step to form the pillar 70.

Second Embodiment

Figure 8:
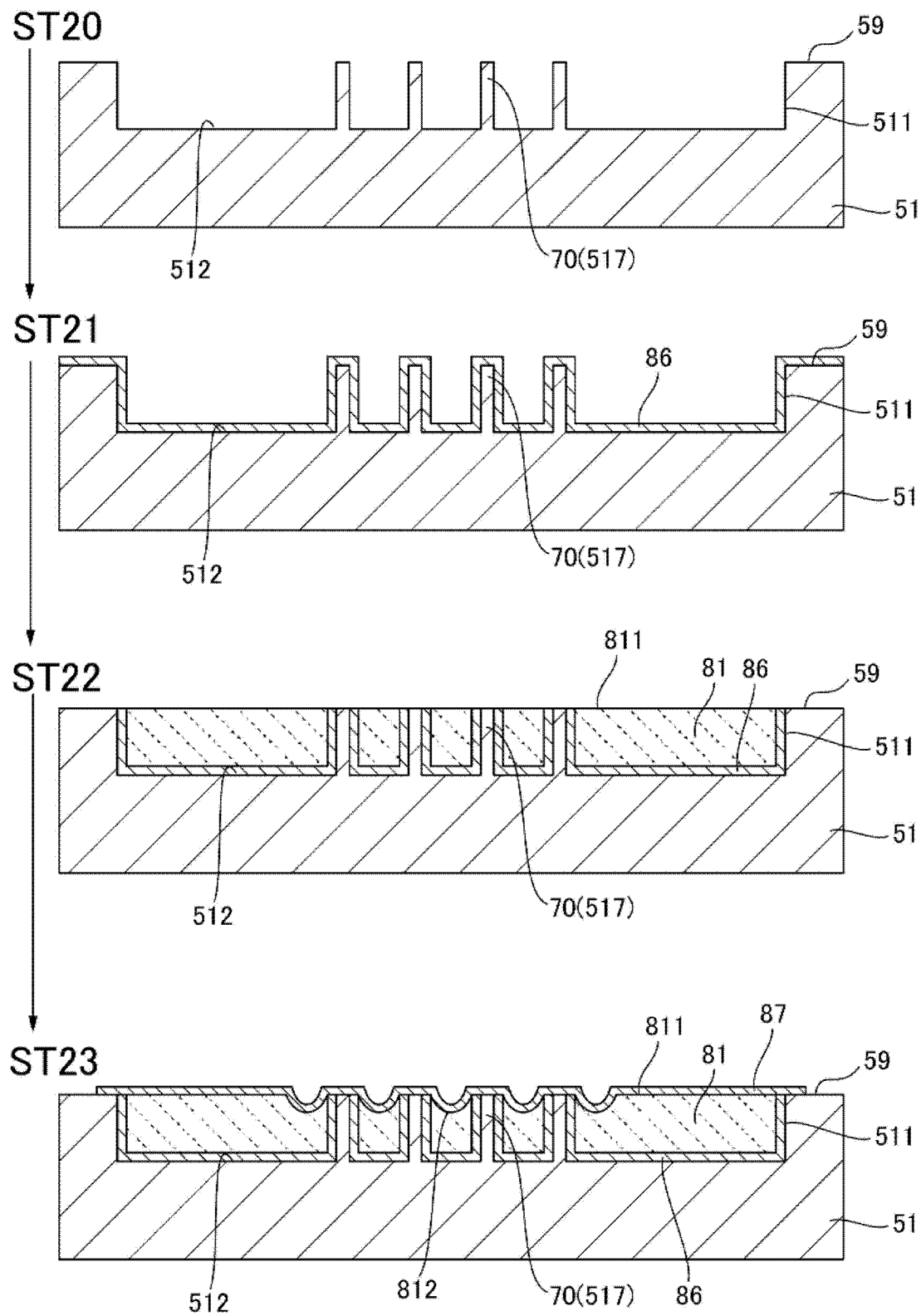
FIG. 8 is an explanatory diagram according to a second embodiment of the present disclosure.
Figure 9:
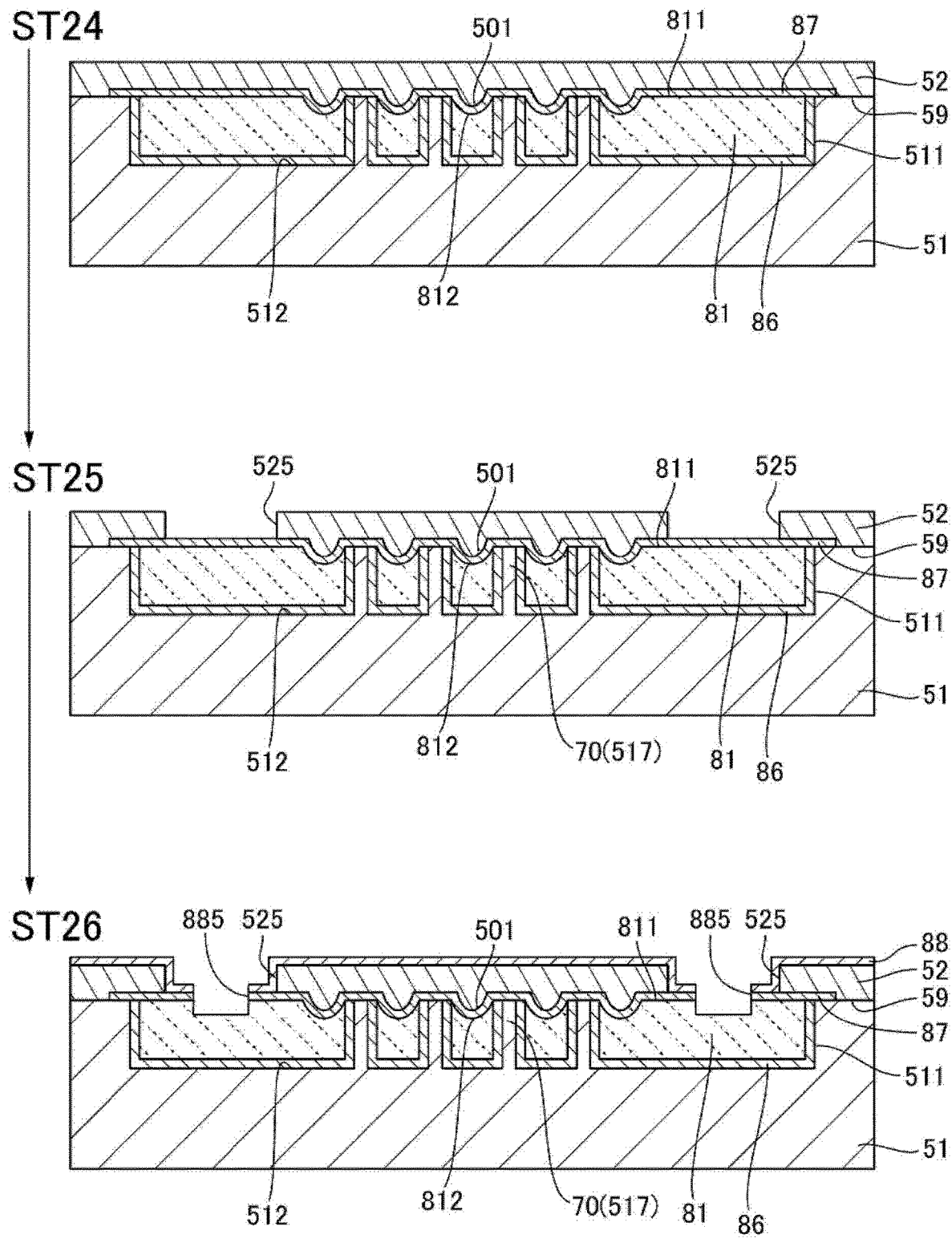
FIG. 9 is an explanatory diagram according to the second embodiment of the present disclosure.
Figure 10:
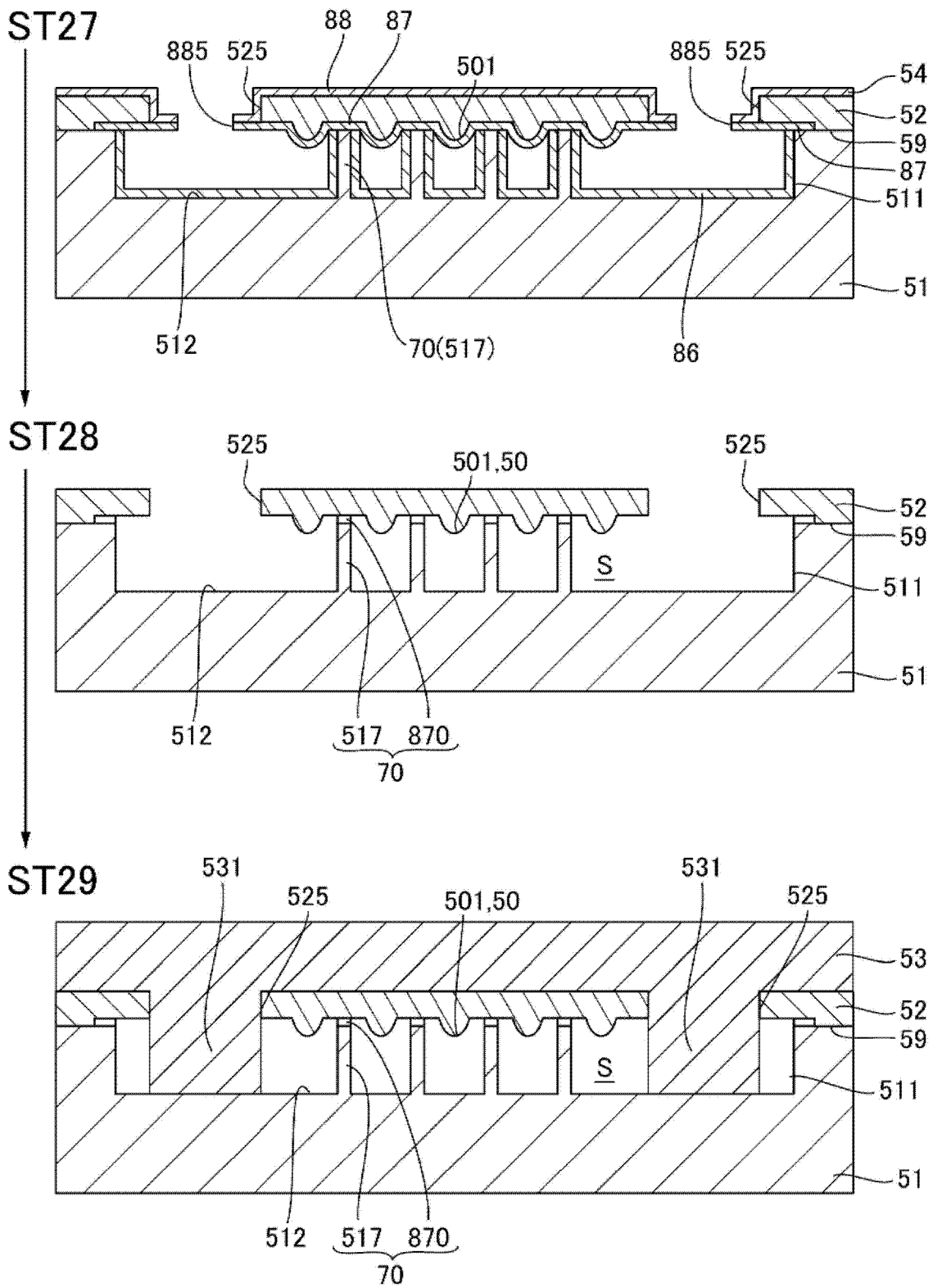
FIG. 10 is an explanatory diagram according to the second embodiment of the present disclosure.

FIGS. 8, 9, and 10 are explanatory diagram according to a second embodiment of the present disclosure. FIGS. 8, 9, and 10 schematically illustrate steps of forming the lens 50 illustrated in FIG. 4 from among the steps of manufacturing the electro-optical device 100. Note that the basic configuration of this embodiment is similar to that in the first embodiment. Thus, common elements are denoted as the same reference characters, and explanation thereof will not be repeated. Note that, in FIGS. 8, 9, and 10, in order to facilitate understanding of the steps of forming the lens surface 501, the pillar 70, and the protrusion 531, the scale or positional relationship of these elements are shifted. For example, when the first member 51 is cut at a position where the plurality of lens surfaces 501 pass through, the cross section of the pillar 70 is not supposed to be viewed. However, in FIGS. 8, 9, and 10, the cross section of the pillar 70 is illustrated.

In the present embodiment, the lens 50 is configured using the steps illustrated in FIGS. 8, 9, and 10. Thus, at the end of step ST28 illustrated in FIG. 10, the pillar 70 is configured with the pillar-shaped protruding portion 517 that protrudes from the first member 51 toward the second member 52, and a remaining portion 870 including a sacrificial film and left at the end portion of the protruding portion 517.

In the present embodiment, in step ST20 illustrated in FIG. 8, an etching mask is first provided on the first member 51. In this state, etching is applied to the first member 51 through an opening portion of the etching mask to form the recessed portion 511. At this time, etching is applied while leaving the pillar-shaped protruding portion 517 that protrudes from the bottom 512 of the recessed portion 511 to form the pillar-shaped protruding portion 517.

Next, in step ST21, a sacrificial film 86 is formed so as to cover the bottom 512 of the recessed portion 511 and the protruding portion 517 of the first member 51. There is no limitation as to the material of the sacrificial film 86, provided that the etching selection ratio concerning quartz or silicon oxide is high. In the present embodiment, the sacrificial film 81 is made of silicon. Next, in step ST22, the sacrificial film 81 is formed so as to fill the recessed portion 511. Then, the surface of the sacrificial film 81 is flattened to make the sacrificial film 81 and the end portion of the pillar 70 continue with each other to form a flat surface.

Next, in step ST23, in a state where an etching mask is provided on the surface of the sacrificial film 81, isotropic etching is applied to the sacrificial film 81 from an opening portion of the etching mask to form a hemispherical concave surface 812 on the surface 811 of the sacrificial film 81. Then, a sacrificial film 87 made of silicon is formed so as to cover the surface of the sacrificial film 81.

Next, in step ST24 illustrated in FIG. 9, after a silicon oxide film is formed, the surface thereof is flattened to make the second member 52. With this step, a portion of the second member 52 that overlaps with the concave surface 812 of the sacrificial film 81 through the sacrificial film 87 becomes the lens surface 501 having a protruding curved surface. In addition, the protruding portion 517 becomes the pillar 70 that is in contact with the second member 52 through the sacrificial film 87.

Next, in step ST25, in a state where an etching mask is provided on the second member 52, etching is applied to the second member 52 from an opening portion of the etching mask to form the through-hole 525 in the second member 52. Next, in step ST26, a sacrificial film 88 made of silicon is formed so as to cover the second member 52. After this, in a state where an etching mask is provided on the sacrificial film 88, dry etching is applied to the sacrificial films 87 and 88 from an opening portion of the etching mask to form a through-hole 885 that overlaps with the through-hole 525. At this time, in the present embodiment, the sacrificial film 81 is made of silicon or silicon oxide. When the sacrificial film 81 is made of silicon, a portion of the sacrificial film 81 is etched when the through-hole 885 is formed. On the other hand, when the sacrificial film 81 is made of silicon oxide, the sacrificial film 81 is not etched when the through-hole 885 is formed.

Next, in step ST27 illustrated in FIG. 10, etching is applied from the through-holes 885 and 525 to remove the sacrificial film 81. At this time, when the sacrificial film 81 is made of silicon oxide, the sacrificial film 81 is etched while the sacrificial films 86, 87, and 88 are not etched. Thus, in step ST28, etchant is changed to remove, through etching, the sacrificial films 86, 87, and 88 made of silicon. On the other hand, when the sacrificial film 81 is made of silicon, the same etchant is used to continuously carry out steps ST27 and ST28. In any cases, at the end of removal of the sacrificial films 81, 86, 87, and 88, a portion of the sacrificial film 87 is left between the protruding portion 517 and the second member 52. Thus, the pillar 70 that supports the second member 52 is configured with the protruding portion 517 and the remaining portion 870 of the sacrificial film 87.

Next, in step ST29, after the silicon oxide film is formed, the surface thereof is flattened to make the third member 53. At this time, a portion of the third member 53 is also formed within the space S through the through-hole 525. With this step, the portion of the third member 53 extends through the through-hole 525 and the space S to form the protrusion 531 that is in contact with the first member 51.

In a case of the configuration as described above, in the lens 50, a difference in refractive index at the interface between the lens surface 501 and the space S is large. Thus, it is possible to achieve an effect similar to that in the first embodiment, such as achieving the lens 50 exhibiting high positive power without using a material having a large refractive index as well as having a low translucent property.

In addition, in the present embodiment, the sacrificial films 86, 87, and 88 are provided. Thus, at the time of removing the sacrificial film 81, it is possible to protect the first member 51 and the second member 52. Thus, silicon oxide, which is the same material as the first member 51 and the second member 52, can be used for the sacrificial film 81. By using silicon oxide, it is possible to form a film through a chemical vapor deposition (CVD) method or the like having a high film-forming velocity.

Third Embodiment

Figure 11:
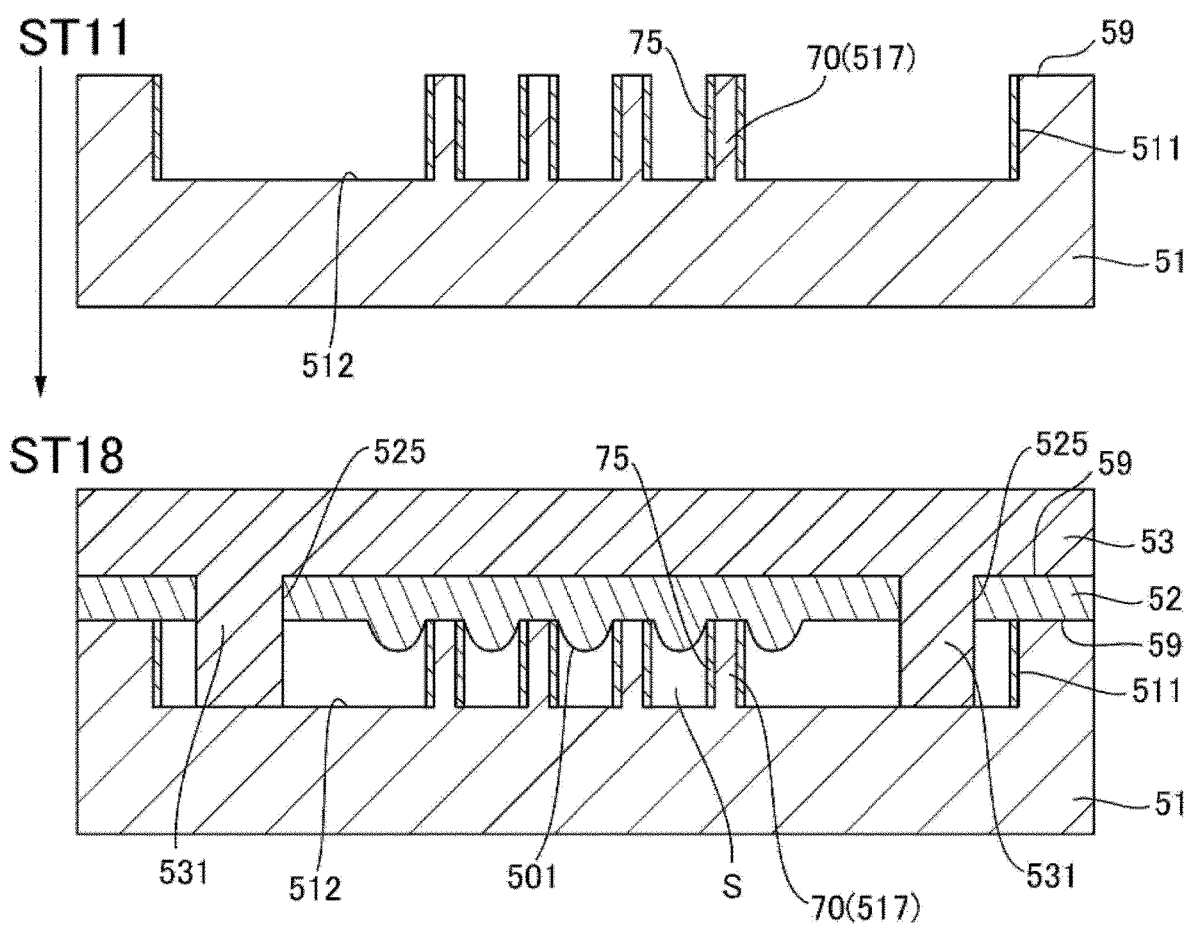
FIG. 11 is an explanatory diagram according to a third embodiment of the present disclosure.

FIG. 11 is an explanatory diagram according to a third exemplary embodiment of the present disclosure. FIG. 11 schematically illustrates a portion of the steps of forming the lens 50 illustrated in FIG. 4 from among the steps of manufacturing the electro-optical device 100. Note that the basic configuration of this embodiment is similar to that in the first embodiment. Thus, common elements are denoted as the same reference characters, and explanation thereof will not be repeated. Note that, in FIG. 11, in order to facilitate understanding of the steps of forming the lens surface 501, the pillar 70, and the protrusion 531, the scale or positional relationship of these elements are shifted. For example, when the first member 51 is cut at a position where the plurality of lens surfaces 501 pass through, the cross section of the pillar 70 is not supposed to be viewed. However, in FIG. 11, the cross section of the pillar 70 is illustrated.

In the present embodiment, in step ST11 that has been described with reference to FIG. 6, after the pillar-shaped protruding portion 517 that protrudes from the first member 51 is formed, a protective film 75 that covers the side surface of the protruding portion 517 is formed. Specifically, after the protective film 75 is formed so as to cover the protruding portion 517, anisotropic etching is applied to remove the protective film 75 from the bottom 512 of the recessed portion 511 and the upper end portion of the protruding portion 517. This makes it possible to form the protective film 75 that covers the side surface of the protruding portion 517.

After this, by performing steps similar to those in the first embodiment, at the end of step ST12, it is possible to form the pillar 70 of which side surface is covered with the protective film 75. Thus, in step ST17 illustrated in FIG. 7, at the time of removing the sacrificial film 81, it is possible to prevent the protruding portion 517 that constitutes the pillar 70 from narrowing.

Here, by forming, as the protective film 75, a reflection suppressing film that suppresses reflection at the side surface of the protruding portion 517, it is possible to suppress occurrence of light of which polarization property is deteriorated due to reflection at the side surface of the protruding portion 517. This makes it possible to suppress occurrence of a floating black issue resulting from reflection at the side surface of the protruding portion 517. Here, for the reflection suppressing film, it may be possible to use a metallic material having a low reflection property such as tungsten or tungsten silicide, and also use a single-layer film or stacked film made out of a translucent material having a permittivity different from the protruding portion 517. Here, the "floating black issue" means a phenomenon in which, even if the level of the image signal inputted into the electro-optical device 100 is zero when black is displayed on the electro-optical device 100, light from a light source cannot be completely blocked due to a property of the electro-optical layer 60 or polarizing element, and the light from the light source is leaked and can be seen.

Fourth Embodiment

Figure 12:
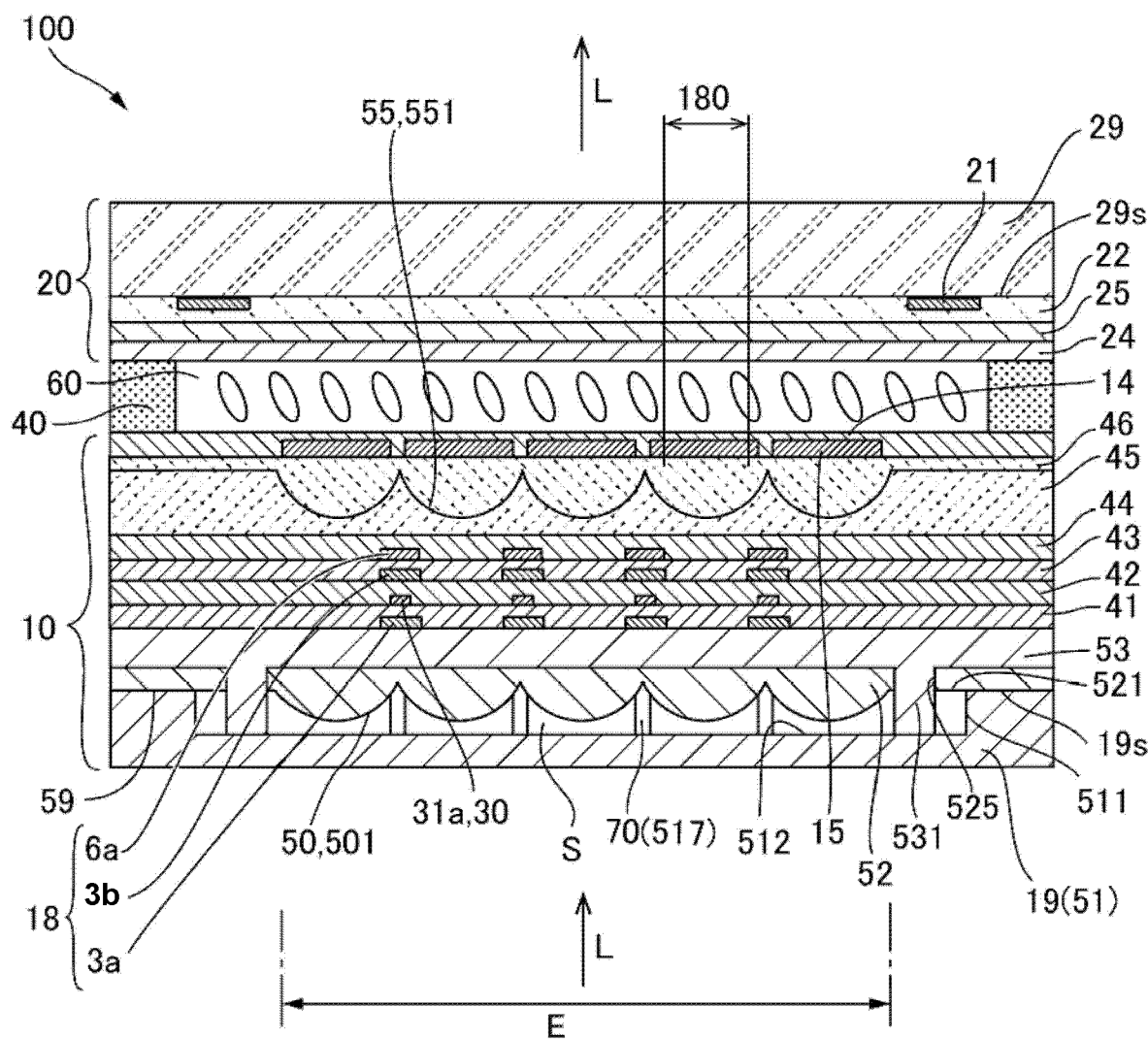
FIG. 12 is an explanatory diagram according to a fourth embodiment of the present disclosure.

FIG. 12 is an explanatory diagram according to a fourth embodiment of the present disclosure. Note that the basic configuration of this embodiment is similar to that in the first embodiment. Thus, common elements are denoted as the same reference characters, and explanation thereof will not be repeated. As illustrated in FIG. 12, in the first substrate 10 of the electro-optical device 100 according to the present embodiment, the lens 50 including the lens surface 501 that is in contact with the space S is formed between the substrate body 19 and the light shielding member 18. In addition, the lens 55 that overlaps with the pixel electrode 15 in plan view is provided between the light shielding member 18 and the pixel electrode 15.

At the time of configuring the lens 55, the lens surface 551 having a concave surface is formed on a surface of the interlayer dielectric 45 that is at the pixel electrode 15 side, and the lens layer 46 is stacked on the surface of the interlayer dielectric 45 that is at the pixel electrode 15 side. In the present embodiment, the interlayer dielectric 45 is made of silicon oxide, and the refractive index is set at 1.48. The lens layer 46 is made of silicon oxynitride, and the refractive index is set at 1.58 to 1.68. This results in the lens 55 having a positive power that causes light to converge. Thus, it is possible to use the lens 55 to optimize the angle of the light beam outputted from the second substrate 20. This makes it possible to suppress vignetting due to the projection optical system when the electro-optical device 100 is used as a light valve in the projection-type display device that will be described later. Thus, it is possible to display a bright image with high quality.

Furthermore, the second substrate 20 does not include a light shielding film in the pixel area E. In other words, the second substrate 20 does not include a black matrix serving as a light shielding film at a position that corresponds to a portion between a pixel electrode 15 and a pixel electrode 15 of the first substrate 10 in plan view. Thus, when passing through the second substrate 20, light L outputted from the second substrate 20 does not experience a phase difference resulting from diffraction due to the black matrix, which results in a reduced possibility of occurrence of disturbance of the polarization state. This makes it possible to suppress a reduction in contrast. In addition, when the second substrate 20 and the first substrate 10 are combined together, a positional shift does not occur between the black matrix of the second substrate 20 and the light shielding member 18 of the first substrate 10, in other words, a set shift does not occur. Thus, the aperture ratio of a pixel P is less likely to reduce, which leads to brightness being less likely to reduce.

Fifth Embodiment

Figure 13:
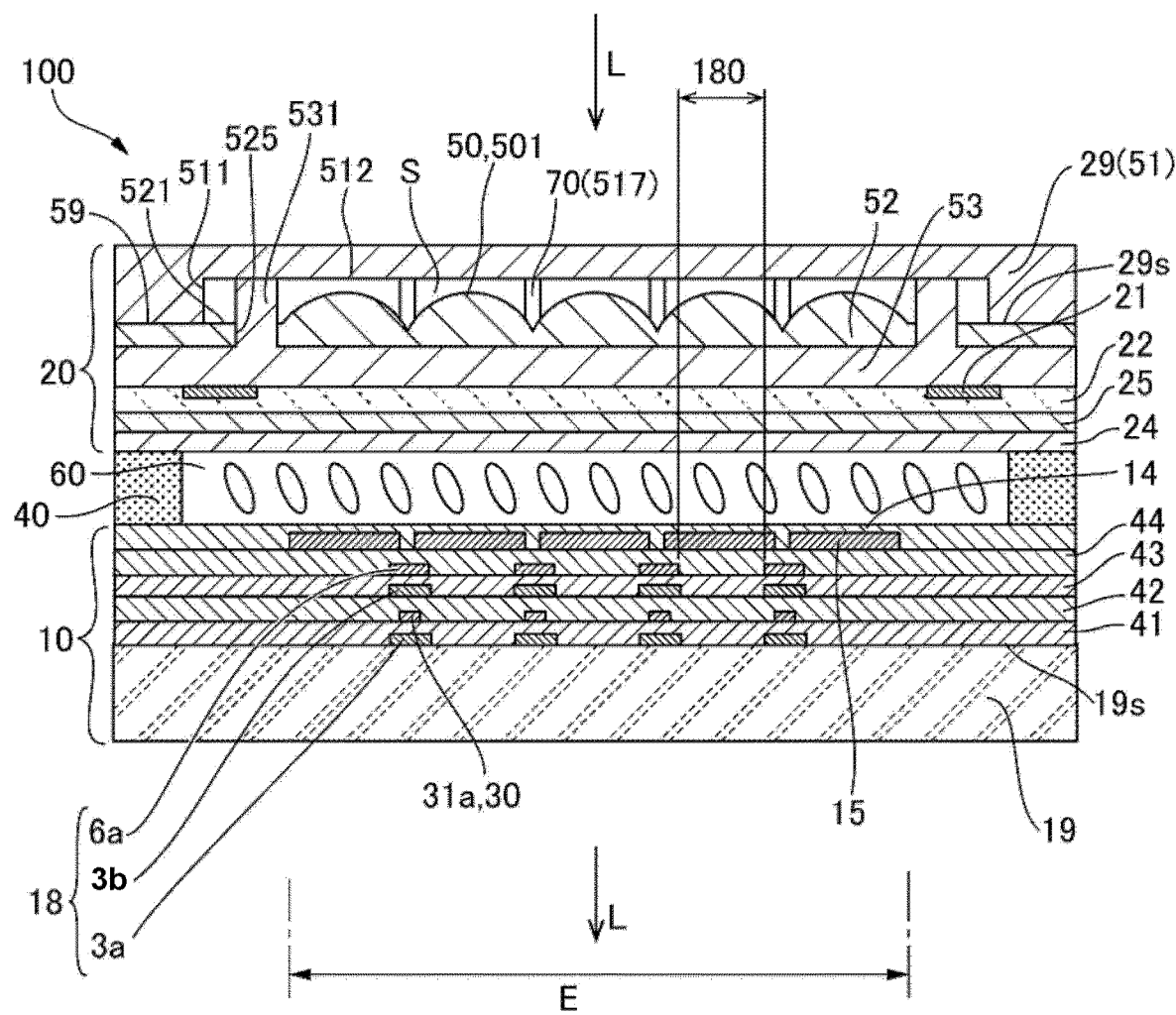
FIG. 13 is an explanatory diagram according to a fifth embodiment of the present disclosure.

FIG. 13 is an explanatory diagram according to a fourth embodiment of the present disclosure. Note that the basic configuration of this embodiment is similar to that in the first embodiment. Thus, common elements are denoted as the same reference characters, and explanation thereof will not be repeated. In the embodiments described above, the first substrate 10 includes the lens 50. However, in the present embodiment, as illustrated in FIG. 13, the lens 50 including the lens surface 501 that is in contact with the space S is formed in the second substrate 20. In addition, light enters from the second substrate 20 side. In the present embodiment, the first member 51 corresponds to the substrate body 29. The second member 52 and the third member 53 are transparent films. The lens 50 can be manufactured using a method similar to the method described in the first and second embodiments. In a case of the configuration described above, it is possible to guide, to the light transmission area 180, light traveling toward the light shielding member 18 from among light entering from the second substrate 20 side. This makes it possible to enhance efficiency of use of light at the time of displaying an image.

Sixth Embodiment

Figure 14:
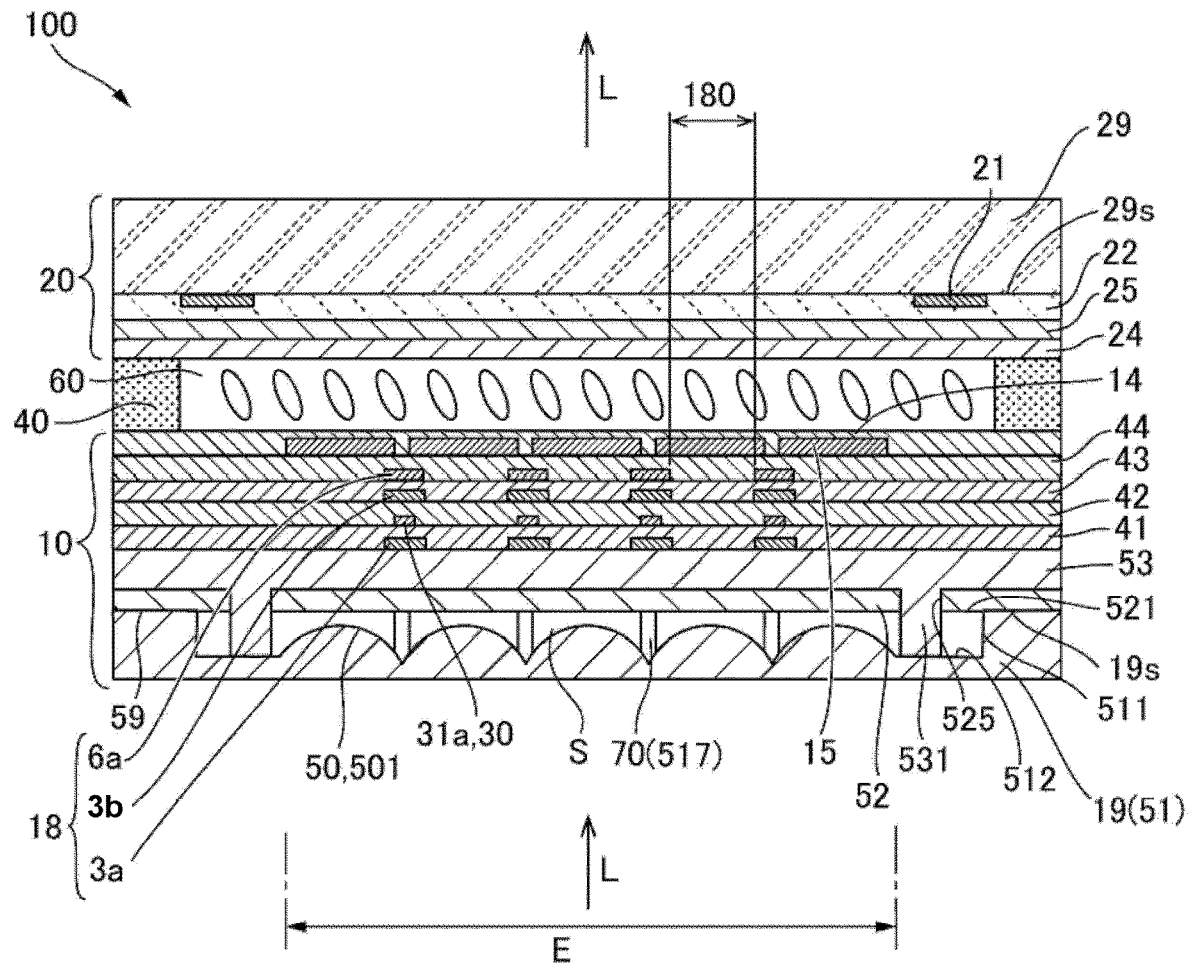
FIG. 14 is an explanatory diagram according to a sixth embodiment of the present disclosure.

FIG. 14 is an explanatory diagram according to a sixth embodiment of the present disclosure. Note that the basic configuration of this embodiment is similar to that in the first embodiment. Thus, common elements are denoted as the same reference characters, and explanation thereof will not be repeated. In the embodiments described above, the lens surface 501 is formed on the second member 52 that is opposed to the bottom 512 of the recessed portion 511 formed in the first member 51. In the present embodiment, however, the lens surface 501 is formed at the bottom 512 of the recessed portion 511. Such a configuration can be achieved by forming a hemispherical photoresist at the bottom 512 of the recessed portion 511, and then applying dry etching to the photoresist and the bottom 512.

OTHER EMBODIMENTS

In the embodiments described above, the first member 51 serves as a substrate body. However, the first member 51 may be a transparent film. For example, the present disclosure may be applied to a case where the plurality of interlayer dielectrics illustrated in FIG. 4 are set to be the first member 51, the second member 52, and the third member 53, and the lens 50 is provided between the interlayer dielectrics.

Electronic Device

Figure 15:
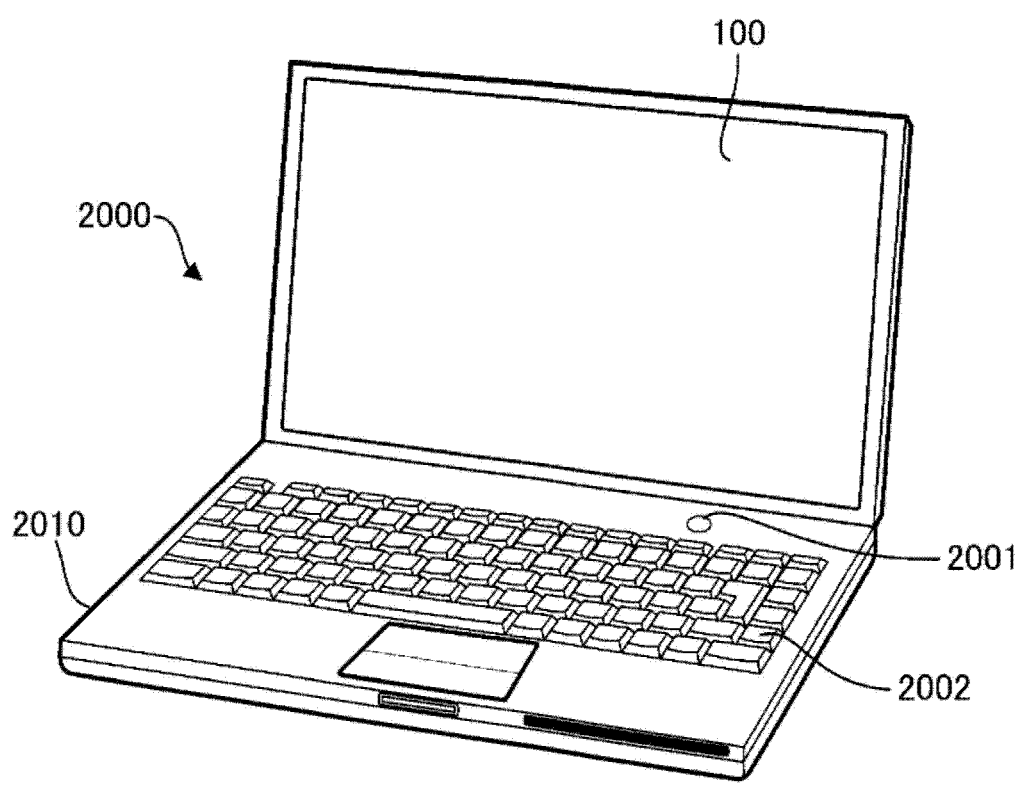
FIG. 15 is a perspective view illustrating a personal computer serving as an example of an electronic device.

The electro-optical device 100 to which the present disclosure is applied can be used in various types of electronic devices. FIG. 15 is a perspective view illustrating a personal computer 2000 serving as an example of an electronic device. The personal computer 2000 includes the electro-optical device 100 configured to display various images, and a main body portion 2010 in which a power source switch 2001 and a keyboard 2002 are installed.

Figure 16:
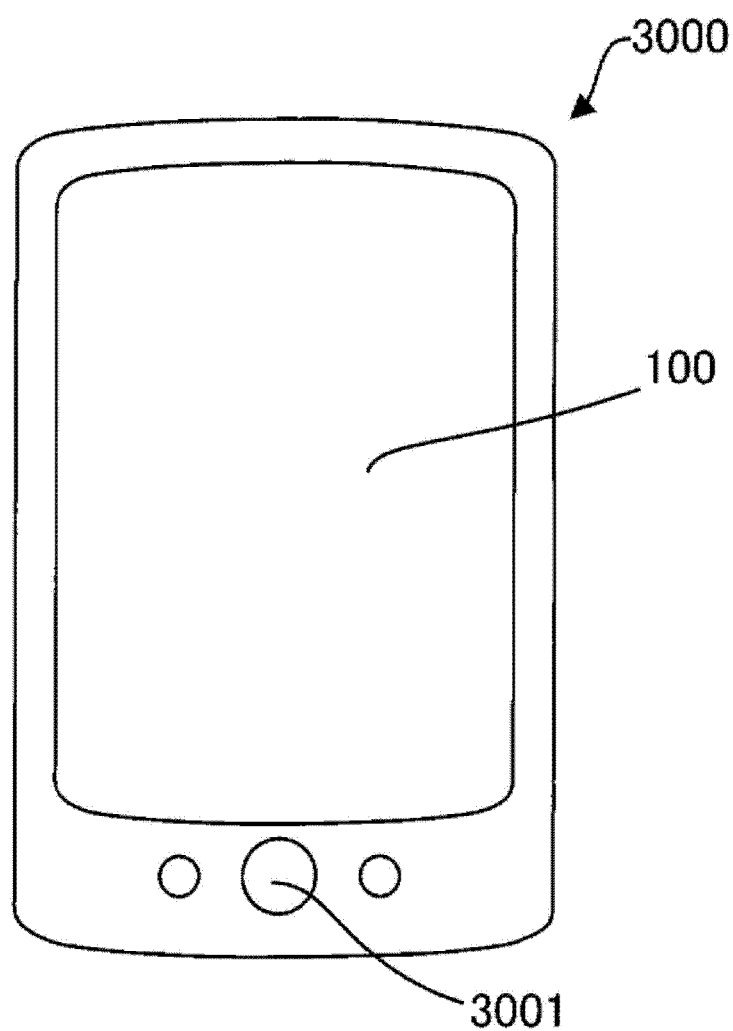
FIG. 16 is a perspective view illustrating a smart phone serving as an example of an electronic device.

FIG. 16 is a perspective view illustrating a smart phone 3000 serving as an example of an electronic device. The smart phone 3000 includes an operation button 3001 and the electro-optical device 100 configured to display various images. The screen content displayed on the electro-optical device 100 is changed in accordance with the operation of the operation button 3001.

Figure 17:
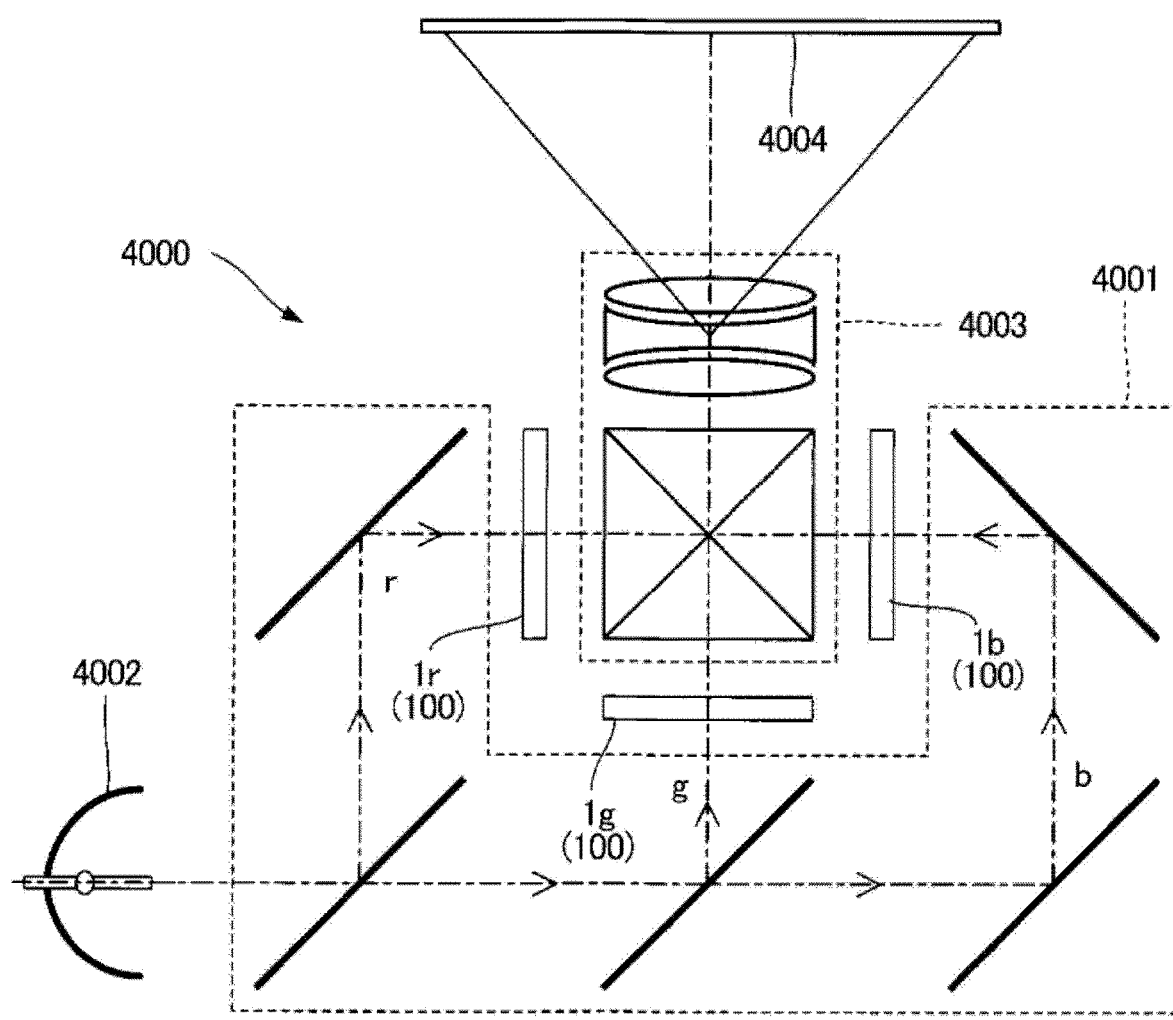
FIG. 17 is an explanatory diagram schematically illustrating a projection-type display device serving as an example of an electronic device.

FIG. 17 is an explanatory diagram schematically illustrating a projection-type display device serving as an example of an electronic device. The projection-type display device 4000 is a three-plate type projector, for example. A light valve 1r is an electro-optical device 100 corresponding to a display color of red. A light valve 1g is an electro-optical device 100 corresponding to a display color of green. A light valve 1b is an electro-optical device 100 corresponding to a display color of blue. In other words, the projection-type display device 4000 includes three light valves 1r, 1g, and 1b corresponding to the display color of red, the display color of green, and the display color of blue, respectively.

An illumination optical system 4001 supplies the light valve 1r with a red color component r of light emitted from an illumination device 4002 serving as a light source, supplies the light valve 1g with a green color component g, and supplies the light valve 1b with a blue color component b. In accordance with a display image, each of the light valves 1r, 1g, and 1b modulates corresponding one of the single color lights supplied from the illumination optical system 4001. A projection optical system 4003 combines light emitted from the individual light valves 1r, 1g, and 1b to project them onto a projection surface 4004.

Note that the projection-type display device may be configured such that an LED light source, a laser light source, or the like configured to emit light of each color is used as a light source unit, and colored light emitted from such a light source is each supplied to another electro-optical device. In addition, the electro-optical device 100 is not limited to a front projection-type projector configured to project from a side at which a projected image is observed. It may be possible to use a rear projection-type projector configured to project at a side opposite to the side at which a projected image is observed.

The personal computer 2000, the smart phone 3000, and the projection-type display device 4000 each include the electro-optical device 100 to which the present disclosure is applied, and thus are able to display a high-quality image.

These are descriptions of the present disclosure on the basis of the preferred embodiments. However, the present disclosure is not limited to those embodiments described above. In addition, the configuration of each component of the present disclosure may be replaced with any configuration that exerts the equivalent functions of the above-described embodiments, and any configuration may be added.

Note that the electronic device to which an optical substrate according to the present disclosure is applied is not limited to the devices that have been given as examples. For example, the electronic device includes a projection-type head-up display (HUD), a direct view head-mounted display (HMD), a personal digital assistance (PDA), a digital still camera, a television, a video camera, a car navigation device, a display unit mounted on a vehicle, an electronic personal organizer, an electronic paper, a calculator, a word processor, a work station, a videophone, a point of sale (POS) terminal, and the like. In addition, the electronic device to which the present disclosure is applied includes a printer, a scanner, a copy machine, a video player, a unit including a touch screen, and the like.

Furthermore, in the description above, the liquid crystal display device is described as one example of the electro-optical device. However, the electro-optical device is not limited to this. For example, it is possible to apply the electro-optical device to an imaging sensor or the like. In addition, it is also possible to apply the electro-optical device, for example, to a display panel using a light emitting element such as an organic electro luminescence (EL), an inorganic EL, a light emitting polymer, or the like, as in the embodiments described above. Furthermore, it is also possible to apply the present disclosure to an electrophoresis display panel using a micro capsule containing a colored liquid and white particles dispersed in the liquid, as in the embodiments described above.

What is claimed is:

1. An electro-optical device comprising:
   a first member having a translucent property;
   a second member having a translucent property and opposed to the first member with a space being interposed therebetween;
   a third member having a translucent property and provided at an opposite side from the first member with respect to the second member;
   a plurality of pixel electrodes provided at the opposite side from the first member with respect to the second member;
   a plurality of lens surfaces having a protruding curved surface and provided at one surface of a surface, opposed to the second member, of the first member and a surface, opposed to the first member, of the second member, the plurality of lens surfaces overlapping with the plurality of pixel electrodes respectively in plan view; and
   a pillar extending through the space and being in contact with the first member and the second member,
   wherein the second member includes a through-hole that overlaps, in plan view, with the space, the through-hole being only provided outside a pixel area in which the pixel electrodes are arranged, the pixel area being overlapped with a gap between every adjacent two of the pixel electrodes in plan view, and a portion of the third member extends through the through-hole and the space and protrudes up to a position where the portion is in contact with the first member.

2. The electro-optical device according to claim 1, wherein
   the pillar is provided at a position that overlaps, in plan view, with a region surrounded by the plurality of lens surfaces.

3. The electro-optical device according to claim 1, wherein
   a protection layer is stacked at a side surface of the pillar.

4. The electro-optical device according to claim 3, wherein
   the protection layer includes a reflection suppressing film configured to suppress reflection at the side surface of the pillar.

5. The electro-optical device according to claim 1, wherein
   the pillar includes a pillar-shaped protruding portion that protrudes from the first member toward the second member.

6. The electro-optical device according to claim 1, wherein
   a surface of the first member that is opposed to the second member includes a recessed portion that is recessed toward an opposite side from the second member, the recessed portion being provided in a region that overlaps, in plan view, with the pixel area in which the pixel electrodes are arranged, and
   the plurality of lens surfaces are provided in a region that overlaps, in plan view, with a bottom of the recessed portion.

7. The electrode-optical device according to claim 1 comprising:
   a first substrate including the pixel electrodes and a switching element electrically coupled to the pixel electrodes; and
   a second substrate opposed to the first substrate with an electro-optical layer being interposed between the first substrate and the second substrate, wherein
   at least one substrate of the first substrate and the second substrate includes the first member, the space, and the second member.

8. The electro-optical device according to claim 1, wherein
   the first member includes a light-transmitting substrate body, and
   the second member includes a transparent film.

9. An electronic device comprising the electro-optical device according to claim 1.

* * * * *